(12) United States Patent
Vu et al.

(10) Patent No.: US 7,684,835 B1
(45) Date of Patent: Mar. 23, 2010

(54) WAKE ON WIRELESS LAN SCHEMES

(75) Inventors: Chuong Vu, San Jose, CA (US);
Timothy Donovan, Livermore, CA (US); Kapil Chhabra, Sunnyvale, CA (US); Sandesh Goel, Fremont, CA (US)

(73) Assignee: Marvell Interntional Ltd., Hamilton (BM)

( * ) Notice: Subject to any disclaimer, the term of this patent is extended or adjusted under 35 U.S.C. 154(b) by 875 days.

(21) Appl. No.: 11/472,056

(22) Filed: Jun. 21, 2006

Related U.S. Application Data

(60) Provisional application No. 60/738,926, filed on Nov. 21, 2005, provisional application No. 60/698,564, filed on Jul. 12, 2005.

(51) Int. Cl.
*H04M 1/00* (2006.01)

(52) U.S. Cl. .................. 455/574; 455/127.1; 455/127.5; 455/343.2

(58) Field of Classification Search .................. 455/574, 455/68, 572, 127.1, 127.5, 147, 343.2, 343.5, 455/13.4, 456.2, 556.1; 370/338, 311; 713/322, 713/323, 300
See application file for complete search history.

(56) References Cited

U.S. PATENT DOCUMENTS

| | | | | |
|---|---|---|---|---|
| 6,976,181 | B2 * | 12/2005 | Dai et al. | 713/320 |
| 7,454,634 | B1 * | 11/2008 | Donovan et al. | 713/322 |
| 2004/0151149 | A1 * | 8/2004 | Song et al. | 370/338 |
| 2007/0016812 | A1 * | 1/2007 | Song et al. | 713/300 |
| 2008/0072087 | A1 * | 3/2008 | Bibikar et al. | 713/323 |
| 2008/0274731 | A1 * | 11/2008 | Koenck et al. | 455/426.1 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

(Continued)

*Primary Examiner*—Tan Trinh

(57) ABSTRACT

A power-management system for wireless network devices includes a media access control module (MAC) that receives a first enable signal and based thereon selectively transmits and receives data packets. A clock generator module receives a second enable signal and based thereon selectively generates a clock signal that is communicated to the MAC. A power management module receives configuration information associated with a plurality of power savings modes. The power management module generates the first and second enable signals based on a selected one of the power savings modes and the configuration information.

56 Claims, 11 Drawing Sheets

OTHER PUBLICATIONS

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems —Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

802.11n; IEEE P802.11-04/0889r6; Wireless LANs, TGn Sync Proposal Technical Specification; 131 pages.

IEEE Std 802.16/2004 (Revision of IEEE Std 802.16/2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE 802.20-PD-06, IEEE P 802.20 V 14, Jul. 16, 2004, Draft 802.20 Permanent Document, System Requirements for IEEE 802.20 Mobile Broadband Wireless Access Systems—Version 14, 23 pages.

IEEE Std 802.11h-2003; (Amendment to IEEE Std 801.11-1999 Edition (Reaff 2003) IEEE Standard for Information Technology—Telecommunications and information exchange between systems—Local and metropolitan area networks—Specific requirements—Part 11: Wireless LAN Medium Access Control (MAC) and Physical Layer (PHY) specifications; Amendment 5: Spectrum and Transmit Power Management Extensions in the 5 GHz band in Europe; IEEE Computer Society, Sponsored by the LAN/MAN Standards Committee; 75 pages.

* cited by examiner

WAKE ON WIRELESS LAN SCHEMES

CROSS-REFERENCE TO RELATED APPLICATIONS

This application claims the benefit of U.S. Provisional Application Nos. 60/738,926, filed on Nov. 21, 2005 and 60/698,564, filed on Jul. 12, 2005. The disclosure of the above application is incorporated herein by reference.

FIELD OF THE INVENTION

The present invention relates to power saving methods in wireless networking devices.

BACKGROUND OF THE INVENTION

Portable wireless network devices include a wireless network interface that consumes power from a power supply, such as a battery. In order to conserve power and extend battery life, the wireless network devices often include a power saving mechanism whereby the device can turn off the interface when it is not needed. While these mechanisms are effective at conserving power, they can require an undesirable amount of supervision by the device and may keep the interface awake longer than needed.

SUMMARY OF THE INVENTION

A power-management system for wireless network devices includes a media access control module (MAC) that receives a first enable signal and based thereon selectively transmits and receives data packets. A clock generator module receives a second enable signal and based thereon selectively generates a clock signal that is communicated to the MAC. A power management module receives configuration information associated with a plurality of power savings modes. The power management module generates the first and second enable signals based on a selected one of the power savings modes and the configuration information.

In other features an oscillator receives a third enable signal and based thereon selectively generates a periodic signal that is communicated to the clock generator module. The power management module generates the third enable signal in accordance with the selected power savings mode and the configuration information. A host interface module translates the configuration information between a first data bus and a second data bus that communicates with the power management module. The host interface module polls a chip select signal and sends a wake-up signal to the power management module based on the chip select signal.

In other features the configuration information indicates an access category (AC). The power management module generates the first and second enable signals further based on the data packets belonging to the indicated AC. The power management module generates the first and second enable signals in a first predetermined order when enabling the MAC and clock generator module and generates the first and second enable signals in a second predetermined order when disabling the MAC and clock generator module.

In other features the MAC is otherwise compatible with at least one of the Bluetooth standard, Institute of Electrical and Electronics Engineers (IEEE) standard 802.11, 802.11a, 802.11b, 802.11g, 802.11h, 802.11n, 802.16, and 802.20. A wireless network device includes the power-management system and includes a host that communicates the configuration information with the first data bus. The power management module initiates an event signal that is communicated to the host. The host initiates a wake signal that is communicated to the power management module.

In other features the power management module initiates an event signal that accompanies a state change of one of the first and second enable signals. A first interface module generates a first event signal and translates the configuration information between a first data bus and a second data bus that communicates with the power management module. A second interface module generates a second event signal and translates the configuration information between a third data bus and the second data bus. The power management module initiates one of the first and second event signals to indicate a state change of at least one of the first and second enable signals. The power management module initiates one of the first and second event signals based on the configuration information. The second enable signal has a regular period and the packets include data that indicates a power saving mode is enabled.

A power-management method for wireless network devices includes receiving a first enable signal at a media access control module (MAC) and based thereon selectively transmitting and receiving data packets, receiving a second enable signal and based thereon selectively generating a clock signal and communicating the clock signal to the MAC, and receiving configuration information associated with a plurality of power savings modes and generating the first and second enable signals based on the configuration information.

In other features the method includes generating a third enable signal based on the configuration information, generating a periodic signal based on the third enable signal, and communicating the periodic signal to the MAC. The method includes translating the configuration information between a first data bus and second data bus. The method includes polling a chip select signal and further generating the first and second enable signals based on the chip select signal. The configuration information indicates an access category (AC) and further comprising generating the first and second enable signals further based on the data packets that are associated with the indicated AC. The method includes generating the first and second enable signals in a first predetermined order when enabling the MAC and the clock signal and generating the first and second enable signals in a second predetermined order when disabling the MAC and the clock signal.

In other features the MAC is otherwise compatible with at least one of the Bluetooth standard, Institute of Electrical and Electronics Engineers (IEEE) standard 802.11, 802.11a, 802.11b, 802.11g, 802.11h, 802.11n, 802.16, and 802.20. The method includes communicating the configuration information with a host that communicates over the first data bus. The method includes generating an event signal when the MAC receives one of the data packets and communicating the event signal to the host. The method includes generating a wakeup signal at a predetermined time and further generating the first and second enable signals based on the wakeup signal.

In other features the method includes generating an event signal based on a state change of at least one of the first and second enable signals. The method includes generating a first event signal and translating the configuration information between a first data bus and a second data bus, and generating a second event signal and translating the configuration information between a third data bus and the second data bus. The first and second event signals indicate a state change of at least one of the first and second enable signals. At least one of the first and second event signals initiates based on the configuration information. The second enable signal has a regular period and the packets include data that indicates a power saving mode is enabled.

A power-management system for wireless network devices includes a media access control (MAC) means for receiving a first enable signal and based thereon selectively transmitting and receiving data packets, clock generator means for receiving a second enable signal and based thereon selectively generating a clock signal that is communicated to the MAC, and power management means for receiving configuration information associated with a plurality of power savings modes and generating the first and second enable signals based on a selected one of the power savings modes and the configuration information.

In other features the power-management system includes oscillator means for receiving a third enable signal and based thereon selectively generating a periodic signal that is communicated to the clock generator module. The power management means generates the third enable signal in accordance with the selected power savings mode and the configuration information. The power management system includes host interface means for translating the configuration information between a first data bus and a second data bus that communicates with the power management means. The host interface means polls a chip select signal and sends a wake-up signal to the power management means based on the chip select signal. The configuration information indicates an access category (AC). The power management means generates the first and second enable signals further based on a data packet associated with the indicated AC. The power management module generates the first and second enable signals in a first predetermined order when enabling the MAC means and clock generator means and generates the first and second enable signals in a second predetermined order when disabling the MAC means and clock generator means.

The MAC means is otherwise compatible with at least one of the Bluetooth standard, Institute of Electrical and Electronics Engineers (IEEE) standard 802.11, 802.11a, 802.11b, 802.11g, 802.11h, 802.11n, 802.16, and 802.20. A wireless network device includes the power-management system and host means for communicating the configuration information with the first data bus.

In other features the power management means initiates an event signal that is communicated to the host means. The host means initiates a wake signal that is communicated to the power management means. The power management means initiates an event signal that accompanies a state change of one of the first and second enable signals.

In other features the power management system includes a first interface means for generating a first event signal and translating the configuration information between a first data bus and a second data bus that communicates with the power management means, and a second interface means for generating a second event signal and translating the configuration information between a third data bus and the second data bus. The power management means initiates one of the first and second event signals to indicate a state change of at least one of the first and second enable signals. The power management means initiates one of the first and second event signals based on the configuration information. The second enable signal has a regular period and the packets include data that indicates a power saving mode is enabled.

In still other features, the systems and methods described above are implemented by a computer program executed by one or more processors. The computer program can reside on a computer readable medium such as but not limited to memory, non-volatile data storage and/or other suitable tangible storage mediums.

A power-management computer program for wireless network devices includes receiving a first enable signal at a media access control module (MAC) and based thereon selectively transmitting and receiving data packets, receiving a second enable signal and based thereon selectively generating a clock signal and communicating the clock signal to the MAC, and receiving configuration information associated with a plurality of power savings modes and generating the first and second enable signals based on the configuration information.

In other features the computer program includes generating a third enable signal based on the configuration information, generating a periodic signal based on the third enable signal, and communicating the periodic signal to the MAC. The computer program includes translating the configuration information between a first data bus and second data bus. The computer program includes polling a chip select signal and further generating the first and second enable signals based on the chip select signal. The configuration information indicates an access category (AC) and further comprising generating the first and second enable signals further based on the data packets that are associated with the indicated AC. The computer program includes generating the first and second enable signals in a first predetermined order when enabling the MAC and the clock signal and generating the first and second enable signals in a second predetermined order when disabling the MAC and the clock signal.

In other features the MAC is otherwise compatible with at least one of the Bluetooth standard, Institute of Electrical and Electronics Engineers (IEEE) standard 802.11, 802.11a, 802.11b, 802.11g, 802.11h, 802.11n, 802.16, and 802.20. The computer program includes communicating the configuration information with a host that communicates over the first data bus. The computer program includes generating an event signal when the MAC receives one of the data packets and communicating the event signal to the host. The computer program includes generating a wakeup signal at a predetermined time and further generating the first and second enable signals based on the wakeup signal.

In other features the computer program includes generating an event signal based on a state change of at least one of the first and second enable signals. The computer program includes generating a first event signal and translating the configuration information between a first data bus and a second data bus, and generating a second event signal and translating the configuration information between a third data bus and the second data bus. The first and second event signals indicate a state change of at least one of the first and second enable signals. At least one of the first and second event signals initiates based on the configuration information. The second enable signal has a regular period and the packets include data that indicates a power saving mode is enabled.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
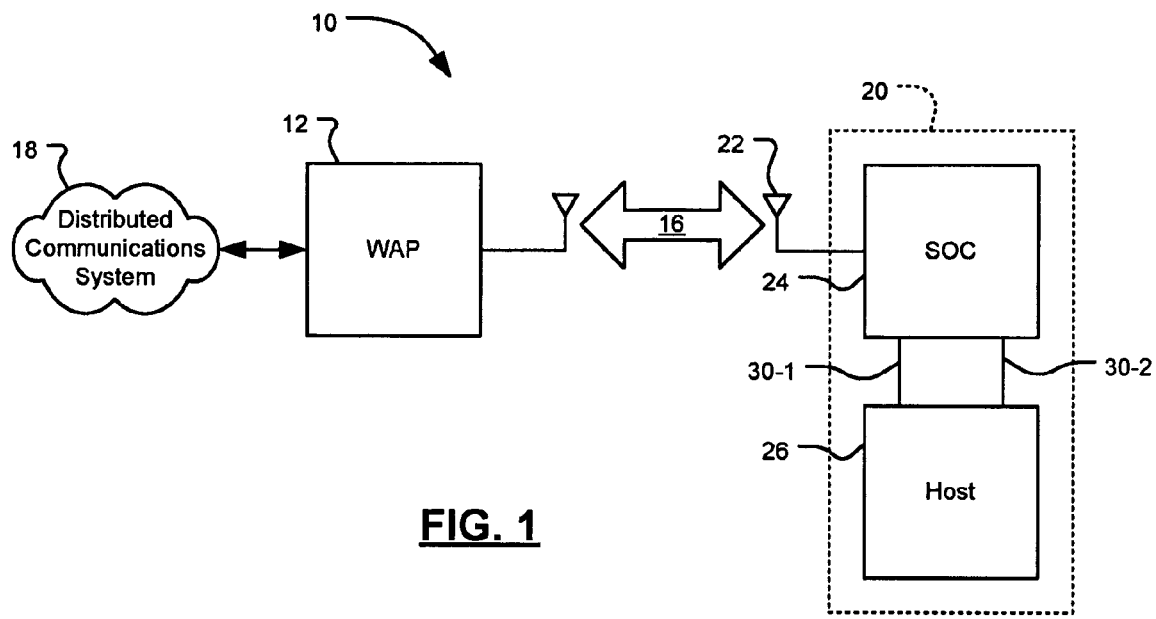
FIG. 1 is a functional block diagram of a wireless local area network (WLAN)

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

Referring now to FIG. 1, a WLAN 10 is shown. A wireless access point (WAP) 12 provides a connection between a wireless communication channel 16 and a distributed communication system 18, such as the Internet. A wireless station (STA) 20 includes an antenna 22 for communicating with WAP 12 over channel 16. The wireless communications can be compliant with at least one of the Institute of Electrical and Electronics Engineers (IEEE) standards 802.11, 802.11a, 802.11b, 802.11g, 802.11h, 802.11n, 802.16, and 802.20, and/or the Bluetooth standard published by the Bluetooth Special Interest Group (SIG). The aforementioned standards are hereby incorporated by reference in their entirety.

Antenna 22 communicates with a SOC 24 that includes power saving features that are described in more detail below. The power saving features can help increase battery life of a portable STA 20. SOC 24 communicates with a host 26 via a host bus 30-1 and/or a general purpose input/output (GPIO) bus 30-2, referred to collectively as communication buses 30. Communication buses 30 communicate in pertinent part using an application programming interface (API) of SOC 24. The API accommodates predefined instructions and generates responses to the instructions, which are used to configure the power saving features of SOC 24. Communication buses 30 can also be used to communicate application data between SOC 24 and host 26.

Figure 2:
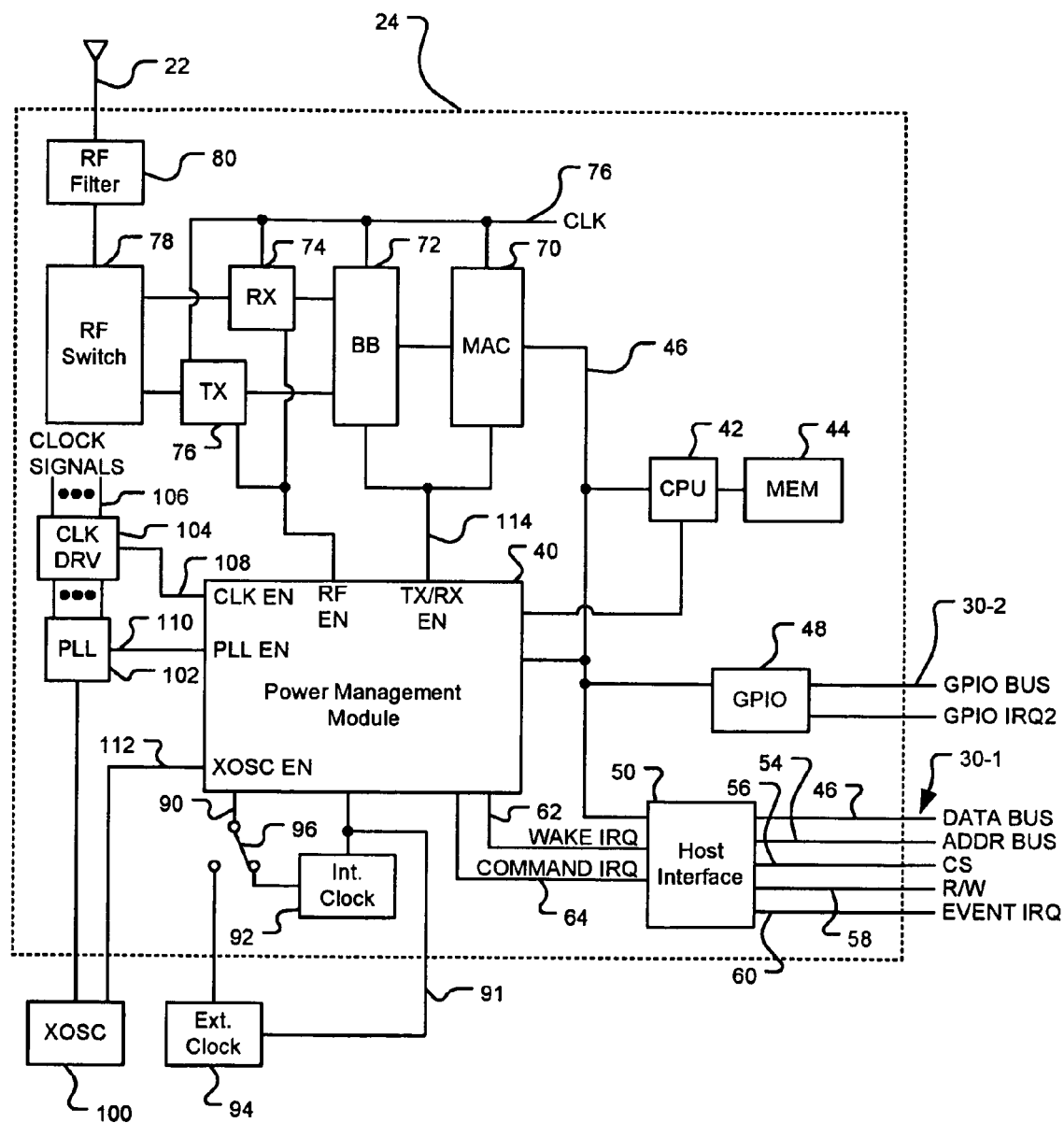
FIG. 2 is a functional block diagram of a wireless communication system-on-chip (SOC)

Referring now to FIG. 2, a functional block diagram of SOC 24 is shown. SOC 24 includes various modules that are switched on and off by a power management module (PMM) 40. A CPU 42 communicates with a memory 44, such as RAM, ROM, PROM, Flash, EPROM and/or EEPROM. Memory 44 stores firmware for implementing the API, which controls behavior of PMM 40. CPU 42 implements the API and configures PMM 40 accordingly.

An internal bus 46 provides a communication path between CPU 42, PMM 40, a GPIO module 48, and a host interface module 50. GPIO module 48 and a host interface module 50 convert and/or buffer messages between internal bus 46 and host bus 30-1 and GPIO bus 30-2, respectively.

GPIO module 48 can generate a GPIO interrupt request (GPIO IRQ) in response to receiving a control message from host 26. GPIO module 48 can also send a control signal to host 26 via GPO bus 30-2. The GPIO IRQ and control signal can be used to flag events in the power saving features as described below.

Host bus 30-1 includes a data bus 52, an address bus 54, a chip select signal (CS) 56, a read/write signal (R/W) 58, and an event interrupt (EVENT IRQ) 60. Address bus 54 and CS 56 are used to select individual registers within host interface module 50. R/W 58 determines whether the selected register is being read or written by data bus 52. Host interface 50 generates EVENT IRQ 60 in response to receiving a predetermined message via internal bus 46. EVENT IRQ 60 can be also used to flag events in the power saving features as described below.

Host interface module 50 also generates a wake interrupt request signal (WAKE IRQ) 62 and/or a command interrupt request signal (COMMAND IRQ) 64 in response to receiving predetermined respective API messages via host bus 30-1. In one configuration host interface module 50 samples CS 56 and generates WAKE IRQ 62 when host 20 asserts CS 56. This allows host 20 to wake up SOC 24 by communicating dummy data with SOC 24. WAKE IRQ 62 and COMMAND IRQ 64 are communicated to PMM 40. WAKE IRQ 62 can be used to wake PMM 40 from a low power state as described below. COMMAND IRQ 64 can be used to indicate to PMM 40 that an API instruction has been received at host interface module 50.

A media access control module (MAC) 70 communicates with a baseband controller module (BB) 72. MAC 70 also communicates with internal bus 46 and sends and receives data to and from host 26 through host interface module 50. BB 72 receives modulated signals through a receive channel 74 and transmits modulated signals through a transmit channel

76. BB 72 bidirectionally converts the modulated signals to/from digital packets communicated to/from MAC 70. Receive channel 74 includes an RF demodulator that communicates with an RF switch 78. Transmit channel 76 includes an RF modulator that communicates with RF switch 78. RF switch 78 connects one of receive and transmit channels 74, 76 to antenna 22 at any given time.

PMM 40 selectively receives a sleep clock signal 90 from either an internal clock 92 or an external clock 94. PMM 40 configures internal clock 92 and/or external clock 94 to generate sleep clock signal 90 to wake PMM 40 at a predetermined time and/or period as is described below. The API controls a switch 96 that selects whether internal clock 92 or external clock 94 provides sleep clock signal 90. PMM 40 generates a clock configuration signal 91 for configuring internal clock 92 and/or external clock 94.

An external oscillator (XOSC) 100 generates a periodic signal that serves as a time base for various modules of SOC 24. A phase-locked loop (PLL) 102 generates additional frequencies from the accurate PLL signal. A clock driver module 104 generates a plurality of clock signals (CLK) 106 based on the frequencies form PLL 102. The plurality of clock signals are communicated to MAC 70, BB 72, and receive and transmit channels 74, 76 based on their respective clock requirements. PMM 40 can generate a clock enable signal 108 to selectively enable and disable clock signals 106. PMM 40 also generates a PLL enable signal 110 and an XOSC enable signal 112 in accordance with a method described below. The method coordinates the timing of enable signals 108, 110, 112, a TX/RX enable signal 114, and an RF enable signal 115 to provide controlled power-up and power-down sequences for their associated modules of SOC 24. TX/RX enable signal 114 controls power to MAC 70 and BB 72. RF enable signal 115 controls power to receive and transmit channels 74, 76.

Details of communications between host 26, SOC 24, and WAP 12 will now be provided for various power savings modes of SOC 24. The power savings modes operate in various combinations of host 26 and SOC 24 being awake or asleep individually. In the following descriptions, the communications between host 26 and SOC 24 occur over host bus 30-1 and/or GPIO bus 30-2. Also, references to SOC 24 going into a sleep mode and an awake mode indicate that PMM 40 will accordingly power down and power up various internal modules of SOC 24 in accordance with the power-up and power-down sequences, which is described below.

Figure 3:
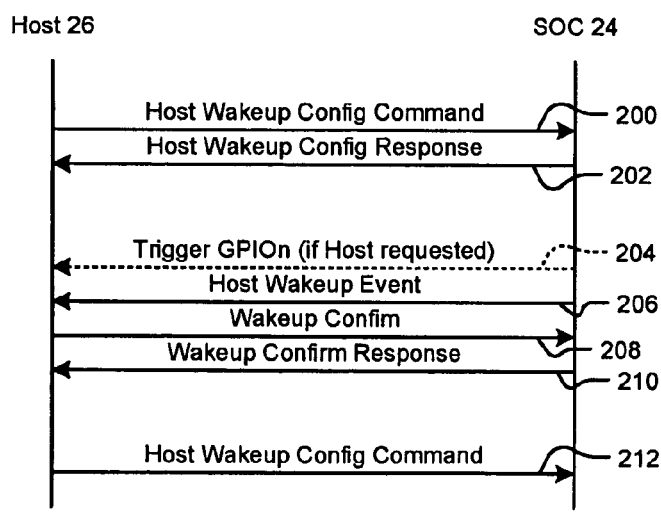
FIG. 3 is a protocol diagram of interactions between a host and the SOC when the SOC remains awake and the host goes to sleep.

Referring now to FIG. 3, a protocol diagram is shown of communications between host 26 and SOC 24 when SOC 24 remains in an active mode and host 26 goes to sleep. At 200, host 26 sends a host wakeup configuration command to SOC 24. The command indicates that host 26 would like to go to sleep and includes an instruction as to whether host 26 will listen for GPIO IRQ2 or EVENT IRQ 60 to be woken up by SOC 24. The command can also indicate that host 26 would like to be awoken only for data that belongs to one or more specified access category (AC). At 202, SOC 24 sends a confirmation message to host 26 and discontinues communicating with host 26.

At 204, SOC 24 can send GPIO IRQ2 to host 26 to indicate that an event has occurred, such as the link has been lost over channel 16 or data has been received for host 26. If host 26 specified an AC in the configuration command, then the data must match the AC for SOC 24 to indicate that an event has occurred. If the data matches the AC then SOC 24 generates the GPIO IRQ2 or EVENT IRQ 60 at 206. At 208, host 26 sends a wakeup confirmation message to SOC 24. At 210, SOC 24 sends a wakeup confirmation response message to host 26. The wakeup confirmation and wakeup confirmation response messages can be communicated over host interface 30-1. After 210, host 26 is awake and can communicate with SOC 24. Host 26 remains awake until it determines that it can go back to sleep and sends another host wakeup configuration command to SOC 24 at 212. The process repeats after 212 until host 26 issues an API command to terminate or change the power saving mode of SOC 24.

Figure 4:
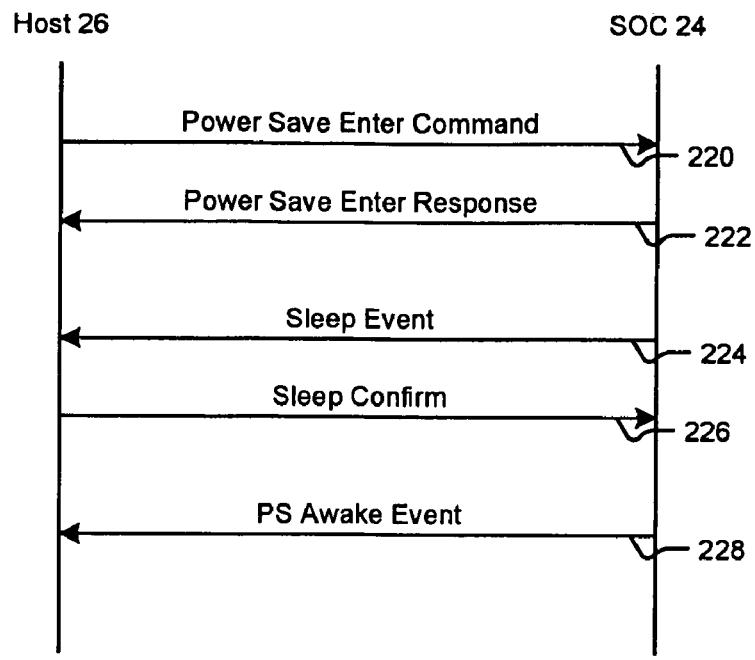
FIG. 4 is a protocol diagram of interactions between the host and the SOC when the SOC goes to sleep and the host remains awake.

Referring now to FIG. 4, a protocol diagram is shown of communications between host 26 and SOC 24 when SOC 24 goes to sleep and host 26 remains awake. Such an arrangement is used, for example, when host 26 configures SOC 24 to sleep and wake only at regular intervals to receive a periodic beacon signal and/or periodic data sent by WAP 12. At 220, host 26 sends a power save enter command to SOC 24. The command indicates that host 26 would like SOC 24 to sleep and includes an instruction as to when SOC should awake. The PMM 40 then configures sleep clock signal 90 to notify SOC 24 when to go to sleep and when to wake up in accordance with the instruction. At 222, SOC 24 issues a power save enter response and waits for sleep clock signal 90 to indicate that it is time for SOC 24 to sleep. At 224, SOC 24 receives sleep clock signal 90 and issues a sleep event signal via GPIO IRQ2 or EVENT IRQ 60 as configured by host 26. Host 26 then issues a sleep confirm signal at 226. SOC 24 goes to sleep upon receiving the sleep confirm signal. Host 26 should not attempt to communicate with SOC 24 while it is asleep or data will be lost. At 228, sleep clock signal 90 wakes SOC 24. SOC 24 immediately sends a power save awake event signal to host 26 via GPIO IRQ2 or EVENT IRQ 60 as configured by host 26. Host 26 can then resume communicating with SOC 24 until sleep clock signal 90 again indicates that it is time for SOC 24 to sleep and SOC 24 issues another sleep event signal 224. Signals 224-228 repeat until host 26 issues an API command to terminate or change the power saving mode of SOC 24.

Figure 5:
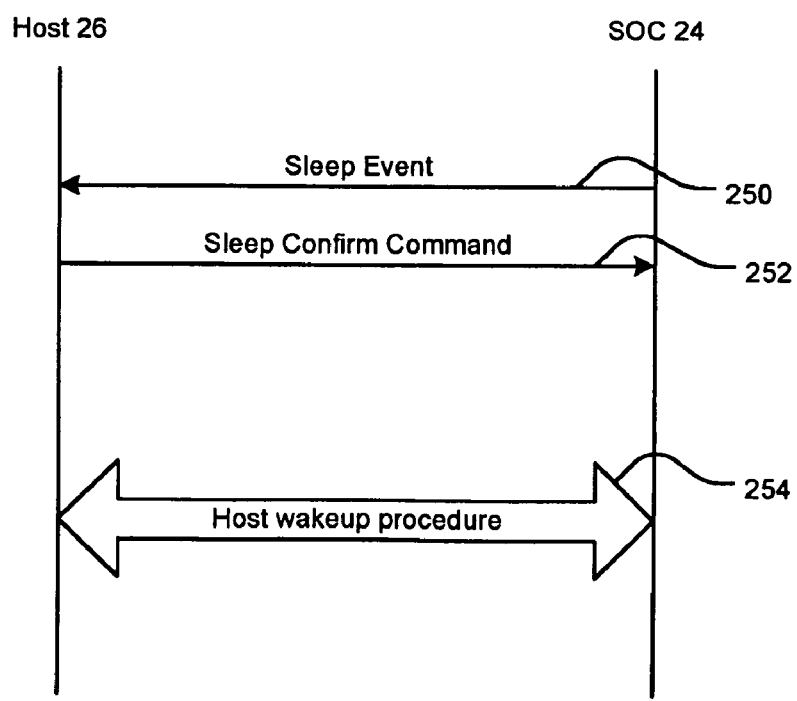
FIG. 5 is a protocol diagram of interactions between the host and the SOC when they both go to sleep in a first synchronized manner.

Referring now to FIG. 5, a first protocol diagram is shown of communications between host 26 and SOC 24 when host 26 would like both to sleep. In the protocol diagram FIG. 5, SOC 24 is already configured go to sleep according to sleep clock signal 90. Host 26 sleep and SOC 24 sleep are then synchronized to prevent messages from being lost between the two due to race conditions. The protocol assumes that SOC 24 has already been configured to sleep as shown above in FIG. 4 and that host 26 does not desire to change the configuration. At 250, SOC 24 issues the sleep event signal. At 252, host issues the sleep confirm signal and the host 26 and SOC 24 go to sleep until SOC 24 wakes up at 254 in accordance with the host wakeup configuration command. When SOC 24 wakes up at 254, it follows steps 204-210 of FIG. 3 to wake up host 26.

Figure 6:
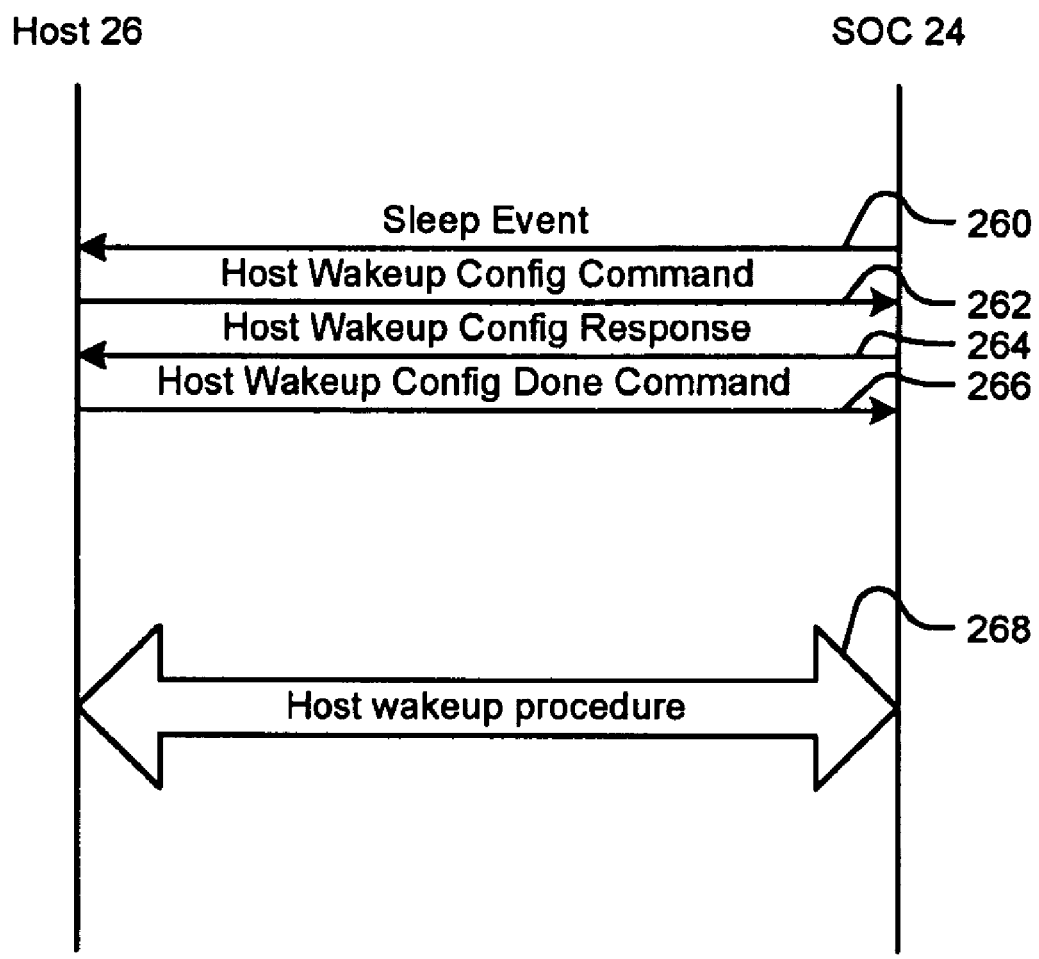
FIG. 6 is a protocol diagram of interactions between the host and the SOC when they both go to sleep in a second synchronized manner.

Referring now to FIG. 6, a protocol diagram is shown of communications between host 26 and SOC 24 when host 26 would like both to sleep. In the protocol diagram FIG. 6, SOC 24 is already configured go to sleep according to sleep clock signal 90. Host 26 sleep and SOC 24 sleep are then synchronized to prevent messages from being lost between the two due to race conditions. The protocol of FIG. 6 differs from FIG. 5 in that host 26 would like to change the power saving mode of SOC 24 before SOC 24 goes to sleep. At 260, SOC 24 issues the sleep event signal. At 262, host 26 replies with the host wakeup configuration command as described in FIG. 3. At 264, SOC 24 then replies with a host wakeup configuration response as described in FIG. 3. At 266, host 26 issues a host wakeup configuration done command to indicate that SOC 24 can go to sleep. After 266, host 26 and SOC 24 go to sleep until SOC 24 wakes up at 268 in accordance with the host wakeup configuration command. When SOC 24 wakes up at 268, it follows steps 204-210 of FIG. 3 to wake up host 26.

Figure 7:
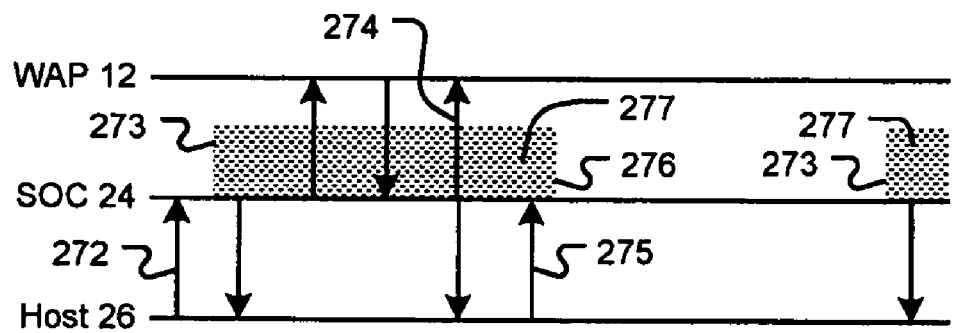
FIG. 7 is a timing diagram of messages between a wireless access point, the SOC, and a host during a first periodic sleep mode.

Referring now to FIG. 7, a timing diagram is shown of a periodic sleep mode of operating SOC 24. The periodic sleep mode is useful when SOC 24 is sending and receiving packets over channel 16 at a predetermined period, such as when SOC 24 is implementing a quality-of-service enhanced (QOS) wireless protocol. QOS protocols can be used when an application running on host 26 requires data and/or generates data at a predetermined rate. Such applications include, without limitation, digital television, digital audio, and voice-over-internet protocol (VoIP) telephony.

Host 26 configures SOC 24 to enter the periodic sleep mode by first sending a configuration message to SOC 24 via the API. The configuration message includes an instruction as to whether host 26 will listen for GPIO IRQ2 or EVENT IRQ 60 to determine when SOC 24 wakes up. The configuration message also specifies a period between SOC 24 wake events and specifies whether SOC 24 will handle only uplink (from SOC 24 to WAP 12), downlink (from WAP 12 to SOC 24), or bidirectional data flow. The period between SOC 24 wake events can be based on data throughput needs of host 26.

SOC 24 can also support several simultaneous periodic sleep modes. For example, SOC 24 can be configured to wake up at the specified period described above and configured again to wake up for one or more periodic beacons specified by a protocol of channel 16.

At a time 272, host 26 sends the periodic sleep mode configuration message to SOC 24. PMM 40 configures sleep clock signal 90 to wake SOC 24 in accordance with the specified period. At a time 273, sleep clock signal 90 wakes SOC 24 and SOC 24 sends EVENT IRQ 60 to host 26. If SOC 24 is configured in one of the uplink and bidirectional modes, then SOC 24 waits for host 26 to provide a packet to send to WAP 12. SOC 24 then sends the packet with a power management (PM) bit cleared to indicate that SOC 24 is awake and WAP 12 should therefore send any packets that it has buffered for SOC 24. Alternatively, if SOC 24 is configured in the downlink mode, then SOC 24 sends a null packet with the PM bit cleared to WAP 12. The null packet indicates that SOC 24 does not have data to send. At time 274, SOC 24 is finished communicating data and/or reaches an end of service period (EOSP). SOC 24 then sends a null data frame to WAP 12 and a sleep request to host 26. At time 275, host 26 acknowledges the sleep request and SOC 24 calculates its next wake up time. PMM 40 then configures sleep clock signal 90 to wake SOC 24 at the beginning 273 of the next wake period before putting SOC 24 to sleep at time 170. Shaded areas 277 indicate periods when SOC 24 is awake.

SOC 24 can decide to go to back to sleep on conditions other than running out of data and/or reaching the EOSP at time 274. For example, SOC 24 can also go back to sleep upon sending and/or receiving a number of packets that exceeds a predetermined packet count. SOC 24 can also go back to sleep due to an inactivity timeout if channel 16 becomes quiet. SOC 24 can also go back to sleep when WAP 12 indicates that it has no more data to send to SOC 24.

The sleep request from SOC 24 at time 274 and the acknowledgement from host 26 at time 275 comprise a sleep handshake. The sleep handshake causes SOC 24 to stay awake longer than necessary and can be implemented in other ways that let SOC 24 go to sleep quicker.

Figure 7A:
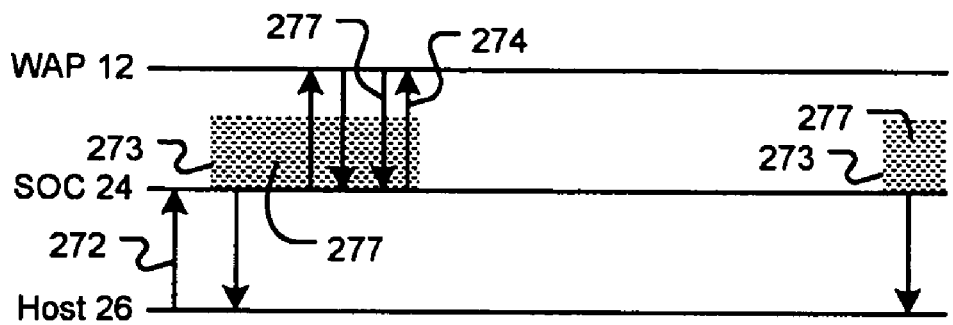
FIG. 7A is a timing diagram of messages between a wireless access point, the SOC, and a host during the first periodic sleep mode using a first alternative sleep handshaking mode.
Figure 7B:
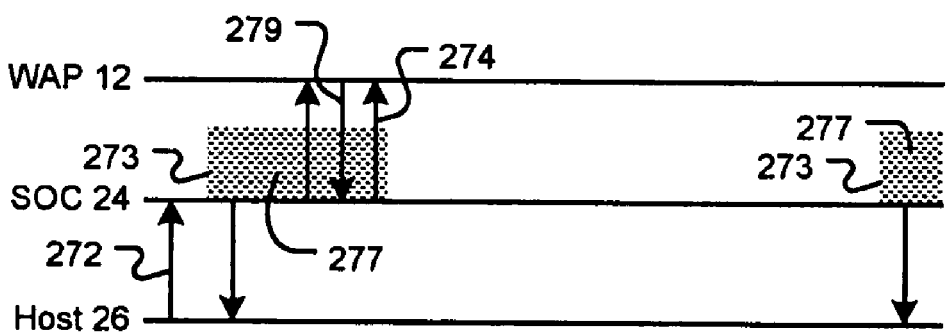
FIG. 7B is a timing diagram of messages between a wireless access point, the SOC, and a host during the first periodic sleep mode using a second alternative sleep handshaking mode.

Referring now to FIGS. 7A and 7B, alternative methods of implementing the sleep handshake are shown. The alternative methods allow SOC 24 to enter the sleep mode without having to stay up to wait for the acknowledgement from host 26. The alternative sleep handshake methods of FIGS. 7A and 7B therefore allow host 26 to go to sleep quicker than the sleep handshake of FIG. 7.

Referring now to FIG. 7A, a first alternative method of providing the sleep handshake is shown. SOC 24 receives one or more packets from WAP 12 and forwards them to host 26. At time 277, WAP 12 indicates that the packet is a last packet. Upon host 26 receiving the last packet form SOC 24, host 26 understands that SOC 24 sleep is imminent. Host 26 therefore stops communicating with SOC 24. At time 274, SOC 24 sends the null packet to WAP 12 and goes to sleep.

Referring now to FIG. 7B, a second alternative method of providing the sleep handshake is shown. SOC 24 receives a packet from WAP 12 at time 279 and forwards it to host 26. When host 26 receives the packet it understands that SOC 24 sleep is imminent. Host 26 therefore stops communicating with SOC 24 at time 279. At time 274, SOC 24 sends the null packet to WAP 12 and goes to sleep.

Figure 8:
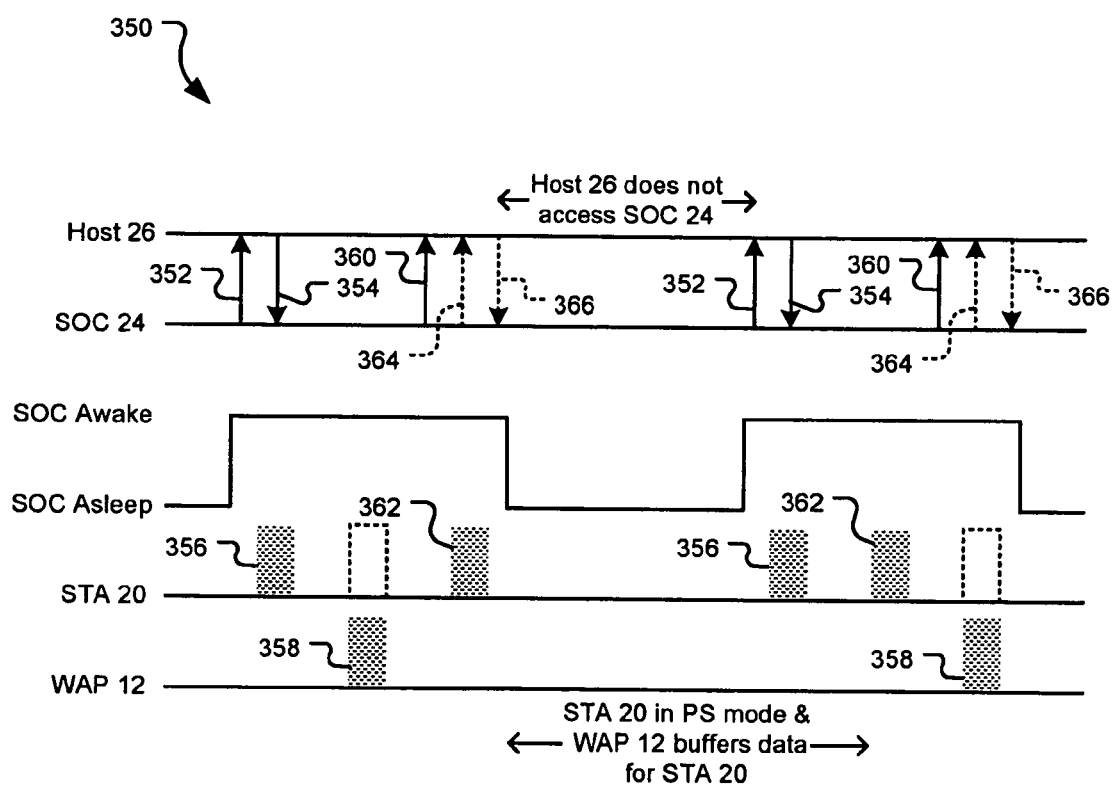
FIG. 8 is a timing diagram of messages between a wireless access point and a wireless station during a second periodic sleep mode.

Referring now to FIG. 8, a timing diagram 350 is shown of a second periodic sleep mode of operating SOC 24. The second periodic sleep mode uses 802.11 Power Save (PS) polls to implement periodic power save when STA 20 uses 802.11 WLAN to transmit/receive periodic traffic flow. By way of non-limiting example, periodic traffic flow can occur with voice and/or video streams. STA 20 does not exit and re-enter the 802.11 PS mode.

SOC 24 will wake up periodically with a period specified by host 26. The period can be set to coincide with 802.11 DTIM beacons to receive any multicast traffic and/or set to coincide with beacons that synchronize the 802.11 local timing synch function (TSF).

The wake up sequence of SOC 24 will now be described. The following example assumes a single periodic data flow between STA 20 and WAP 12 wherein one data packet is sent in both directions each time SOC 24 wakes up. When SOC 24 wakes up it sends an awake event 352 to host 26. Awake event 352 can be sent via GPIO IRQ2 (FIG. 2). At a time 354, host 26 communicates data to SOC 24 for subsequent transmission. During period 356 SOC 24 transmits an 802.11 PS polling message with the PM bit set to 1. During a period 358 WAP 12 responds to the PS polling message by sending buffered data to STA 20. STA 24 monitors an 802.11 More Data bit in a frame received from WAP 12. If the More Data bit is set in the received frame then SOC 24 sends another PS polling message to WAP 12. At time 360 SOC 24 communicates the buffered data to host 26. During a period 362 SOC 24 transmits the data that was communicated from host 25 at time 354. The data is transmitted with the PM bit set to 1.

SOC 24 begins to enter the sleep state when it receives a frame from WAP 12 with the More Data bit set to 0 and host 26 indicates it has no more data to transmit. SOC 24 also begins to enter the sleep state when a predetermined timeout occurs waiting for the aforementioned conditions to occur. Before going to sleep SOC 24 sends a sleep request 364 to host 26. Host 26 then responds with a sleep confirm response 366. Upon receiving sleep confirm response 366 SOC 24 computes the time until its next wake-up and configures sleep clock signal 90 accordingly. Ater host 26 sends sleep confirm response 26 it does not access SOC 24 until it receives another awake event 352.

Figure 9:
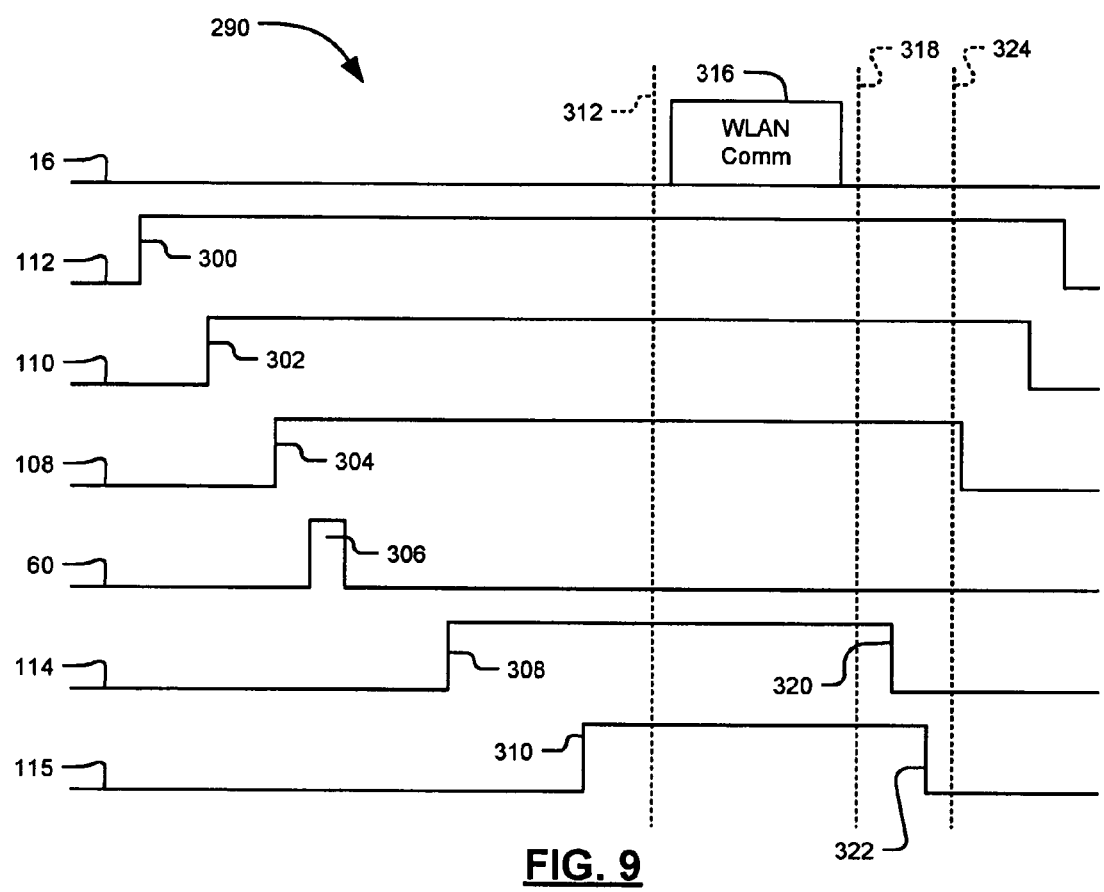
FIG. 9 is a timing diagram depicting a power-up and a power-down sequence of the SOC.

Referring now to FIG. 9, a timing diagram 290 is shown of the various enable signals as SOC 24 wakes up and goes to sleep. PMM 40 remains awake when SOC 24 is in one of the power save modes.

Beginning from the left, timing diagram 290 assumes that SOC 24 is asleep. When PMM 40 receives an indication at 300 that SOC 24 needs to wake up, it immediately asserts XOSC enable signal 112 to energize XOSC 100. In some embodiments SOC 24 can include a power supply that reduces a digital supply voltage when SOC 24 is asleep. In those embodiments the digital supply voltage can also be increased when PMM 40 receives the indication at 300. PMM 40 can receive the indication to wake up from sleep clock signal 90 and/or from host 26. PMM 40 waits a predetermined time for the output frequency of XOSC 100 to stabilize before asserting PLL enable signal 110 at time 302 to energize PLL 102. PMM then waits a predetermined amount of time for PLL 102 to stabilize before asserting clock enable signal 108 at time 304 to energize clock driver module 104. PMM then waits a predetermined time before issuing the event awake signal 306 to host 26 over GPIO IRQ2 or EVENT IRQ 60, as configured by host 26. PMM then waits a predetermined time for host 26 to awake before asserting TX/RX enable signal 114 at time 308. PMM 40 then waits a predetermined time for BB 72 and MAC 70 to stabilize before asserting RF enable signal 115 to enable receive and transmit channel 74, 76 at time 310. At a time 312, the receive and transmit channels 74, 76 have stabilized and SOC 24 is ready to communicate messages 316 over channel 16. It is appreciated by those skilled in the art that the aforementioned sequence events may be rearranged based on stabilization times of the various modules associated with the enable signals.

At time 318, SOC 24 begins to go to sleep in accordance with the power savings mode selected by host 26. PMM 40 waits for MAC 70 and BB 72 to complete sending and/or receiving their respective packets before relinquishing TX/RX enable signal 114 at time 320. PMM 40 then polls receive and transmit channels 74, 76 until they are idle before relinquishing RF enable signal 115 at time 322. At time 324, PMM 40 finishes putting SOC 24 to sleep by sequentially relinquishing clock enable signal 108, PLL enable signal 110, and XOSC enable signal 112, respectively.

Figure 10A:
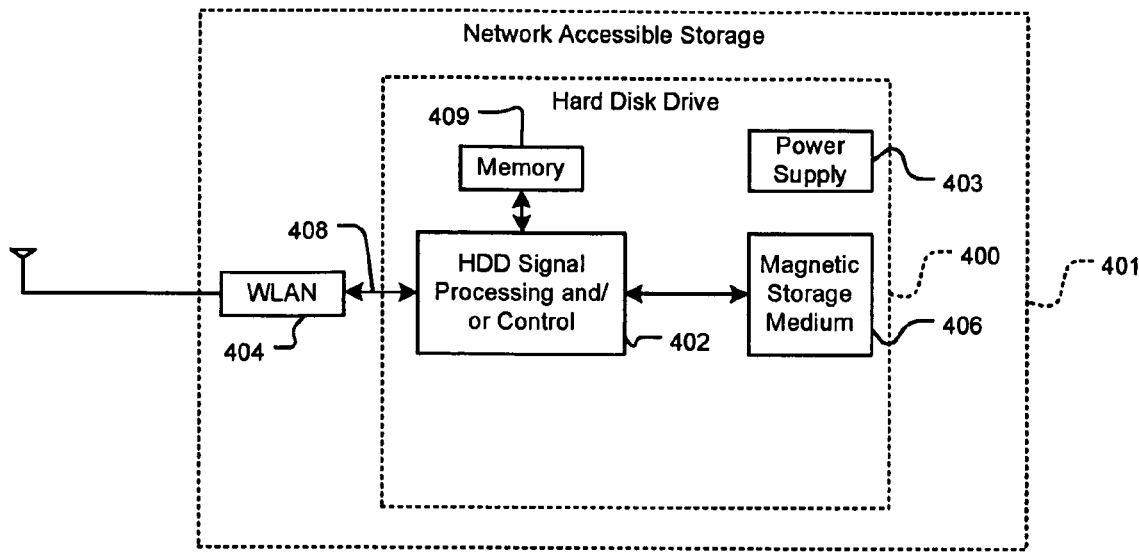
FIG. 10A is a functional block diagram of a hard disk drive.

Referring now to FIGS. 10A-10G, various exemplary implementations of the present invention are shown. Referring now to FIG. 10A, the present invention can be implemented in a network accessed storage module (NAS) 401 that includes a hard disk drive 400. The present invention may implement and/or be implemented in a WLAN module, which is generally identified in FIG. 10A at 404. In some implementations, signal processing and/or control circuit 402 and/or other circuits (not shown) in the HDD 400 may process data, communicate with WLAN module 404, perform coding and/or encryption, perform calculations, and/or format data that is output to and/or received from a magnetic storage medium 406.

The HDD 400 may communicate with another networked device (not shown) such as a computer, a mobile computing device such as a personal digital assistant, cellular phone, media or MP3 player and the like, and/or other device via one or more wired links 408 and/or WLAN module 404. The HDD 400 may be connected to memory 409 such as random access memory (RAM), low latency nonvolatile memory such as flash memory, read only memory (ROM) and/or other suitable electronic data storage. The HDD 400 may also include a power supply module 403.

Figure 10B:
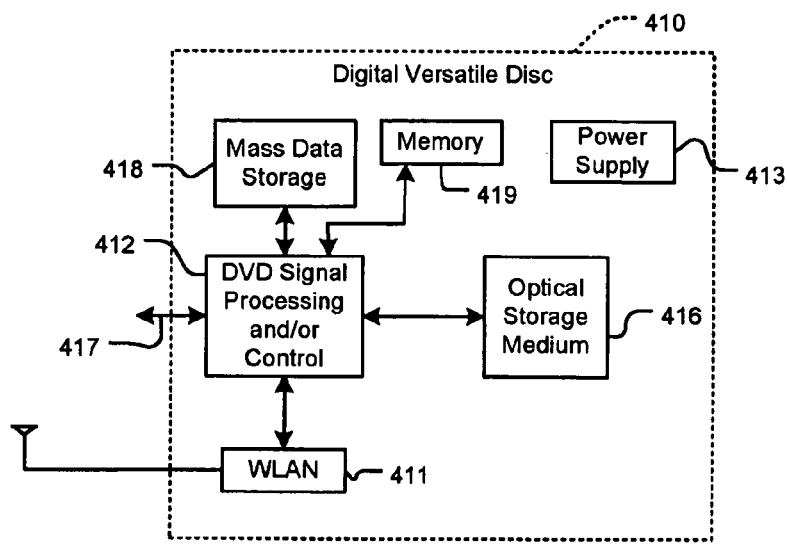
FIG. 10B is a functional block diagram of a digital versatile disk (DVD)

Referring now to FIG. 10B, the present invention can be implemented in a digital versatile disc (DVD) drive 410. The present invention may implement and/or be implemented in a WLAN module which is generally identified in FIG. 10B at 411. Signal processing and/or control circuit 412 and/or other circuits (not shown) in the DVD drive 410 may process data, perform coding and/or encryption, perform calculations, and/or format data that is read from and/or data written to an optical storage medium 416. In some implementations, the signal processing and/or control circuit 412 and/or other circuits (not shown) in the DVD drive 410 can also perform other functions such as encoding and/or decoding and/or any other signal processing functions associated with a DVD drive.

The DVD drive 410 may communicate with an output device (not shown) such as a computer, television or other device via one or more wired links 417 and/or wireless links via WLAN module 411. The DVD drive 410 may communicate with mass data storage 418 that stores data in a nonvolatile manner. The mass data storage 418 may include a hard disk drive (HDD). The HDD may have the configuration shown in FIG. 10A. The HDD may be a mini HDD that includes one or more platters having a diameter that is smaller than approximately 1.8". The DVD drive 410 may be connected to memory 419 such as RAM, ROM, low latency nonvolatile memory such as flash memory and/or other suitable electronic data storage. The DVD drive 410 may also include a power supply 413.

Figure 10C:
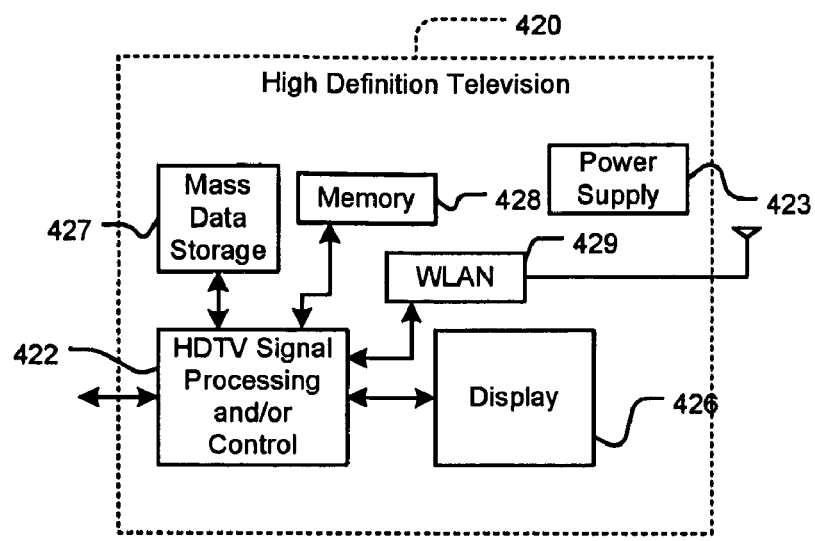
FIG. 10C is a functional block diagram of a high definition television.

Referring now to FIG. 10C, the present invention can be implemented in a high definition television (HDTV) 420. The present invention may implement and/or be implemented in either or both signal processing and/or control circuits, which are generally identified in FIG. 10E at 422, and a WLAN interface 429.

The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 10A and/or at least one DVD may have the configuration shown in FIG. 10B. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may include a power supply 423.

Figure 10D:
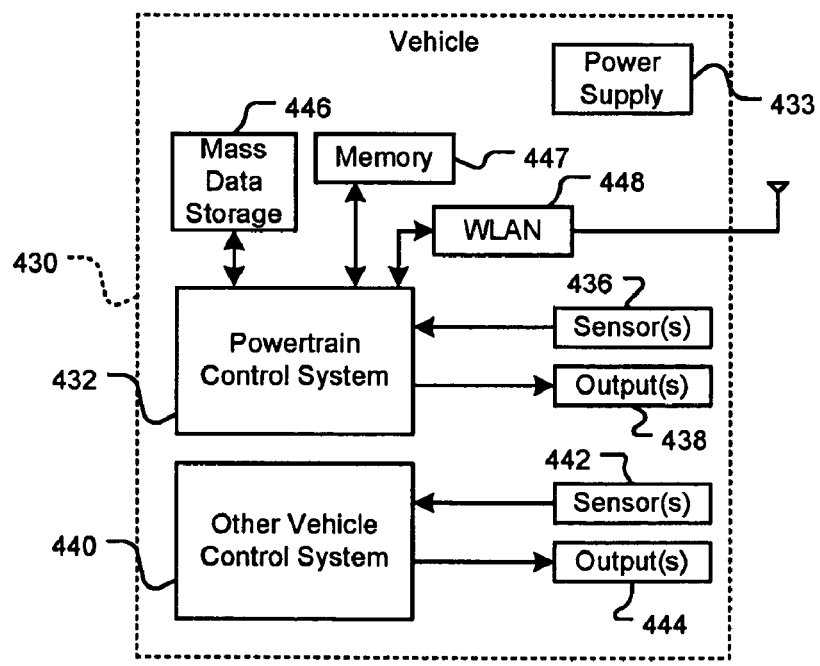
FIG. 10D is a functional block diagram of a vehicle control system.

Referring now to FIG. 10D, the present invention may implement and/or be implemented in a WLAN interface 448 of a vehicle 430. A powertrain control system 432 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. At least one HDD may have the configuration shown in FIG. 10A and/or at least one DVD may have the configuration shown in FIG. 10B. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via WLAN interface 448. Vehicle 430 may also include a power supply 433.

Figure 10E:
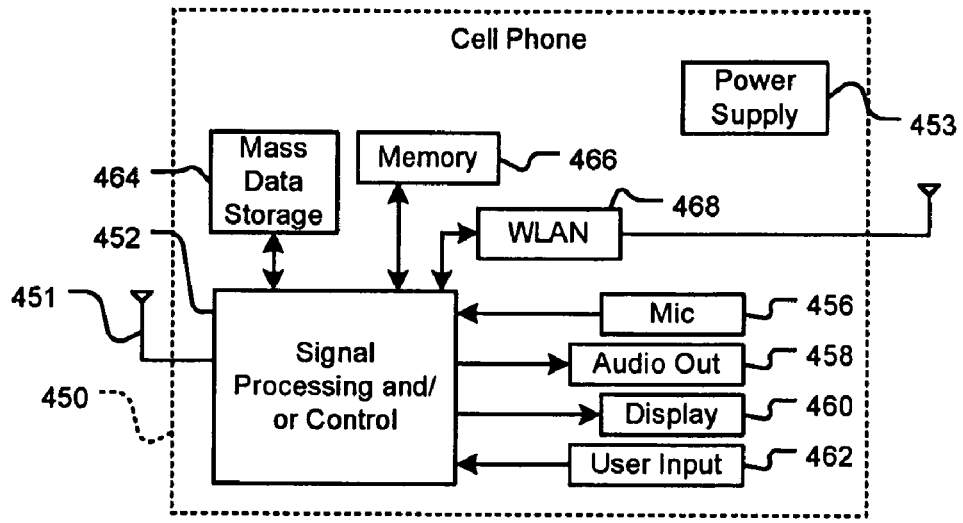
FIG. 10E is a functional block diagram of a cellular phone.

Referring now to FIG. 10E, the present invention can be implemented in a cellular phone 450 that may include a cellular antenna 451. The present invention may implement and/or be implemented in a WLAN interface 468. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. At least one HDD may have the configuration shown in FIG. 10A and/or at least one DVD may have the configuration shown in FIG. 10B. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via WLAN interface 468. Cellular phone 450 may also include a power supply 453.

Figure 10F:
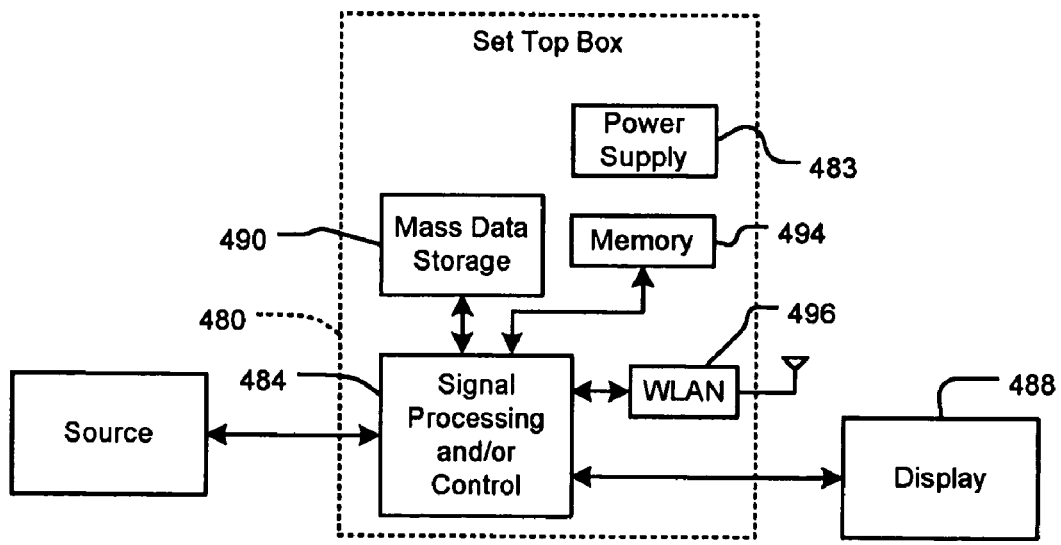
FIG. 10F is a functional block diagram of a set top box.

Referring now to FIG. 10F, the present invention can be implemented in a set top box 480. The present invention may implement and/or be implemented in a WLAN interface 496. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. At least one HDD may have the configuration shown in FIG. 10A and/or at least one DVD may have the configuration shown in FIG. 10B. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via WLAN interface 496. Set top box 480 may also include a power supply 483.

Figure 10G:
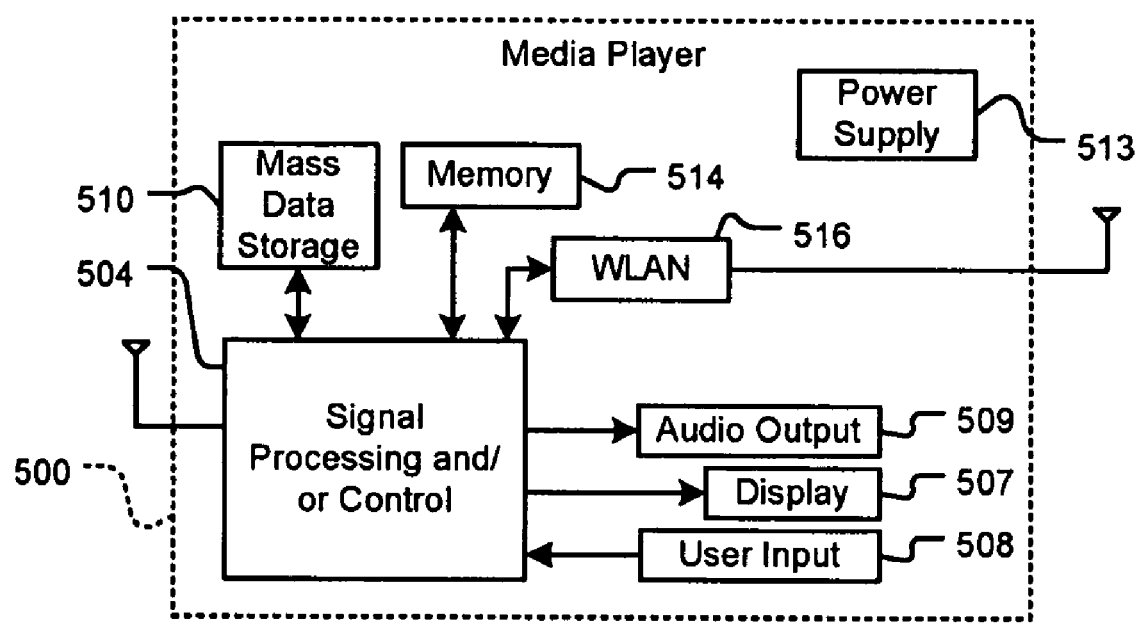
FIG. 10G is a functional block diagram of a media player.

Referring now to FIG. 10G, the present invention can be implemented in a media player 500. The present invention may implement and/or be implemented in a WLAN interface 516. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 10A and/or at least one DVD may have the configuration shown in FIG. 10B. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via WLAN interface 516. Media player 500 may also include a power supply 513. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A power-management system for wireless network devices, comprising:
   a media access control module (MAC) that receives a first enable signal and based thereon selectively transmits and receives data packets;
   a clock generator module that receives a second enable signal and based thereon selectively generates a clock signal that is communicated to the MAC; and
   a power management module that receives configuration information associated with a plurality of power savings modes and generates the first and second enable signals based on a selected one of the power savings modes and the configuration information.

2. The power-management system of claim 1 further comprising:
   an oscillator that receives a third enable signal and based thereon selectively generates a periodic signal that is communicated to the clock generator module and wherein the power management module generates the third enable signal in accordance with the selected power savings mode and the configuration information.

3. The power-management system of claim 1 further comprising a host interface module that translates the configuration information between a first data bus and second data bus that communicates with the power management module.

4. The power management system of claim 3 wherein the host interface module polls a chip select signal and sends a wake-up signal to the power management module based on the chip select signal.

5. A wireless network device comprising the power-management system of claim 3 and further comprising a host that communicates the configuration information with the first data bus.

6. The wireless network device of claim 5 wherein the power management module initiates an event signal that is communicated to the host.

7. The wireless network device of claim 5 wherein the host initiates a wake signal that is communicated to the power management module.

8. The power-management system of claim 1 wherein the configuration information indicates an access category (AC) and wherein the power management module generates the first and second enable signals further based on the data packets belonging to the indicated AC.

9. The power-management system of claim 1 where the power management module generates the first and second enable signals in a first predetermined order when enabling the MAC and clock generator module and generates the first and second enable signals in a second predetermined order when disabling the MAC and clock generator module.

10. The power management system of claim 1 wherein the MAC is otherwise compatible with at least one of the Bluetooth standard, Institute of Electrical and Electronics Engineers (IEEE) standard 802.11, 802.11a, 802.11b, 802.11g, 802.11h, 802.11n, 802.16, and 802.20.

11. The power management system of claim 1 wherein the power management module initiates an event signal that accompanies a state change of one of the first and second enable signals.

12. The power management system of claim 1 further comprising:
a first interface module that generates a first event signal and translates the configuration information between a first data bus and a second data bus that communicates with the power management module; and
a second interface module that generates a second event signal and translates the configuration information between a third data bus and the second data bus;
wherein the power management module initiates one of the first and second event signals to indicate a state change of at least one of the first and second enable signals.

13. The power-management system of claim 12 wherein the power management module initiates one of the first and second event signals based on the configuration information.

14. The power-management system of claim 1 wherein the second enable signal has a regular period and the packets include data that indicates a power saving mode is enabled.

15. A power-management method for wireless network devices, comprising:
receiving a first enable signal at a media access control module (MAC) and based thereon selectively transmitting and receiving data packets;
receiving a second enable signal and based thereon selectively generating a clock signal and communicating the clock signal to the MAC; and
receiving configuration information associated with a plurality of power savings modes and generating the first and second enable signals based on the configuration information.

16. The power-management method of claim 15 further comprising:
generating a third enable signal based on the configuration information;
generating a periodic signal based on the third enable signal; and
communicating the periodic signal to the MAC.

17. The power-management method of claim 15 further comprising translating the configuration information between a first data bus and second data bus.

18. The power management method of claim 17 further comprising polling a chip select signal and further generating the first and second enable signals based on the chip select signal.

19. The power management method of claim 17 further comprising communicating the configuration information with a host that communicates over the first data bus.

20. The power management method of claim 19 further comprising generating an event signal when the MAC receives one of the data packets and communicating the event signal to the host.

21. The power management method of claim 19 further comprising generating a wakeup signal at a predetermined time and further generating the first and second enable signals based on the wakeup signal.

22. The power-management method of claim 15 wherein the configuration information indicates an access category (AC) and further comprising generating the first and second enable signals further based on the data packets that are associated with the indicated AC.

23. The power-management method of claim 15 further comprising generating the first and second enable signals in a first predetermined order when enabling the MAC and the clock signal and generating the first and second enable signals in a second predetermined order when disabling the MAC and the clock signal.

24. The power management method of claim 15 wherein the MAC is otherwise compatible with at least one of the Bluetooth standard, Institute of Electrical and Electronics Engineers (IEEE) standard 802.11, 802.11a, 802.11b, 802.11g, 802.11h, 802.11n, 802.16, and 802.20.

25. The power management method of claim 15 generating an event signal based on a state change of at least one of the first and second enable signals.

26. The power management method of claim 15 further comprising:
generating a first event signal and translating the configuration information between a first data bus and a second data bus; and
generating a second event signal and translating the configuration information between a third data bus and the second data bus, wherein the first and second event signals indicate a state change of at least one of the first and second enable signals.

27. The power management method of claim 26 wherein at least one of the first and second event signals initiates based on the configuration information.

28. The power management method of claim 15 wherein the second enable signal has a regular period and the packets include data that indicates a power saving mode is enabled.

29. A power-management system for wireless network devices, comprising:
media access control (MAC) means for receiving a first enable signal and based thereon selectively transmitting and receiving data packets;

clock generator means for receiving a second enable signal and based thereon selectively generating a clock signal that is communicated to the MAC means; and power management means for receiving configuration information associated with a plurality of power savings modes and generating the first and second enable signals based on a selected one of the power savings modes and the configuration information.

30. The power-management system of claim 29 further comprising:
oscillator means for receiving a third enable signal and based thereon selectively generating a periodic signal that is communicated to the clock generator means and wherein the power management means generates the third enable signal in accordance with the selected power savings mode and the configuration information.

31. The power-management system of claim 29 further comprising host interface means for translating the configuration information between a first data bus and a second data bus that communicates with the power management means.

32. The power management system of claim 31 wherein the host interface means polls a chip select signal and sends a wake-up signal to the power management means based on the chip select signal.

33. A wireless network device comprising the power-management system of claim 31 and further comprising host means for communicating the configuration information with the first data bus.

34. The wireless network device of claim 33 wherein the power management means initiates an event signal that is communicated to the host means.

35. The wireless network device of claim 33 wherein the host means initiates a wake signal that is communicated to the power management means.

36. The power-management system of claim 29 wherein the configuration information indicates an access category (AC) and wherein the power management means generates the first and second enable signals further based on a data packet associated with the indicated AC.

37. The power-management system of claim 29 where the power management means generates the first and second enable signals in a first predetermined order when enabling the MAC means and clock generator means and generates the first and second enable signals in a second predetermined order when disabling the MAC means and clock generator means.

38. The power management system of claim 29 wherein the MAC means is otherwise compatible with at least one of the Bluetooth standard, Institute of Electrical and Electronics Engineers (IEEE) standard 802.11, 802.11a, 802.11b, 802.11g, 802.11h, 802.11n, 802.16, and 802.20.

39. The power management system of claim 29 wherein the power management means initiates an event signal that accompanies a state change of one of the first and second enable signals.

40. The power management system of claim 29 further comprising:
a first interface means for generating a first event signal and translating the configuration information between a first data bus and a second data bus that communicates with the power management means; and
a second interface means for generating a second event signal and translating the configuration information between a third data bus and the second data bus;
wherein the power management means initiates one of the first and second event signals to indicate a state change of at least one of the first and second enable signals.

41. The power-management system of claim 40 wherein the power management means initiates one of the first and second event signals based on the configuration information.

42. The power-management system of claim 29 wherein the second enable signal has a regular period and the packets include data that indicates a power saving mode is enabled.

43. A power-management computer program for wireless devices that is executed by a processor, comprising:
receiving a first enable signal at a media access control module (MAC) and based thereon selectively transmitting and receiving data packets;
receiving a second enable signal and based thereon selectively generating a clock signal and communicating the clock signal to the MAC; and
receiving configuration information associated with a plurality of power savings modes and generating the first and second enable signals based on the configuration information.

44. The power-management computer program of claim 43 further comprising:
generating a third enable signal based on the configuration information;
generating a periodic signal based on the third enable signal; and
communicating the periodic signal to the MAC.

45. The power-management computer program of claim 43 further comprising translating the configuration information between a first data bus and second data bus.

46. The power management computer program of claim 45 further comprising polling a chip select signal and further generating the first and second enable signals based on the chip select signal.

47. The power management computer program of claim 45 further comprising communicating the configuration information with a host that communicates over the first data bus.

48. The power management computer program of claim 47 further comprising generating an event signal when the MAC receives one of the data packets and communicating the event signal to the host.

49. The power management computer program of claim 47 further comprising generating a wakeup signal at a predetermined time and further generating the first and second enable signals based on the wakeup signal.

50. The power-management computer program of claim 43 wherein the configuration information indicates an access category (AC) and further comprising generating the first and second enable signals further based on the data packets that are associated with the indicated AC.

51. The power-management computer program of claim 43 further comprising generating the first and second enable signals in a first predetermined order when enabling the MAC and the clock signal and generating the first and second enable signals in a second predetermined order when disabling the MAC and the clock signal.

52. The power management computer program of claim 43 wherein the MAC is otherwise compatible with at least one of the Bluetooth standard, Institute of Electrical and Electronics Engineers (IEEE) standard 802.11, 802.11a, 802.11b, 802.11g, 802.11h, 802.11n, 802.16, and 802.20.

53. The power management computer program of claim 43 generating an event signal based on a state change of at least one of the first and second enable signals.

54. The power management computer program of claim 43 further comprising:
generating a first event signal and translating the configuration information between a first data bus and a second data bus; and
generating a second event signal and translating the configuration information between a third data bus and the second data bus, wherein the first and second event signals indicate a state change of at least one of the first and second enable signals.

55. The power management computer program of claim 54 wherein at least one of the first and second event signals initiates based on the configuration information.

56. The power management computer program of claim 43 wherein the second enable signal has a regular period and the packets include data that indicates a power saving mode is enabled.

* * * * *